(12) United States Patent
Nakamura et al.

(10) Patent No.: US 12,256,746 B2
(45) Date of Patent: Mar. 25, 2025

(54) SAUSAGE STICKING SYSTEM

(71) Applicant: HITEC CO., LTD., Yokohama (JP)

(72) Inventors: Tatsuo Nakamura, Yokohama (JP); Takayuki Fujimaki, Yokohama (JP); Hideaki Oikawa, Yokohama (JP); Hirokatsu Harasawa, Yokohama (JP); Takashi Arai, Yokohama (JP)

(73) Assignee: HITEC CO., LTD., Yokohama (JP)

( * ) Notice: Subject to any disclaimer, the term of this patent is extended or adjusted under 35 U.S.C. 154(b) by 115 days.

(21) Appl. No.: 18/120,813

(22) Filed: Mar. 13, 2023

(65) Prior Publication Data
US 2024/0049733 A1 Feb. 15, 2024

(30) Foreign Application Priority Data
Aug. 15, 2022 (JP) .................. 2022-129179

(51) Int. Cl.
*A22C 15/00* (2006.01)
*B65G 47/36* (2006.01)

(52) U.S. Cl.
CPC .......... *A22C 15/002* (2013.01); *A22C 15/001* (2013.01); *B65G 47/36* (2013.01); *B65G 2811/095* (2013.01)

(58) Field of Classification Search
CPC ...... A22C 15/00; A22C 15/001; A22C 15/002
USPC ......................................................... 452/51
See application file for complete search history.

(56) References Cited

U.S. PATENT DOCUMENTS

| 4,880,105 A | 11/1989 | Kasai et al. |
| 5,238,353 A | 8/1993 | Kollross et al. |
| 6,290,591 B1 * | 9/2001 | Hergott .................. A22C 11/00 452/51 |
| 7,347,772 B2 * | 3/2008 | Lebsack ............... A22C 15/002 452/177 |
| 7,588,485 B1 * | 9/2009 | Nakamura ........... A22C 15/001 452/51 |
| 8,151,973 B2 * | 4/2012 | Borkiewicz .......... A22C 15/001 198/465.4 |

(Continued)

FOREIGN PATENT DOCUMENTS

| JP | 2006-197935 A | 8/2006 |
| JP | 2019-097539 A | 6/2019 |

OTHER PUBLICATIONS

Exended European Search Report, dated Jan. 25, 2024 in European Application No. 23163430.4 (In English).

*Primary Examiner* — David J Parsley
(74) *Attorney, Agent, or Firm* — McGinn Intellectual Property Law Group, PLLC

(57) ABSTRACT

Provided is a sausage sticking system capable of changing a position and an interval at which a chain of sausages is hung on a stably held stick according to a length of a casing. The sausage sticking system includes a hook conveying unit, a stick holding unit, and a pivoting imparting unit. A loop of a chain of sausages hooked on each of the pivoting hooks of the hook conveying unit is configured to be dropped onto a stick passing through the loop by which pivoting hooks are pivoted. The stick holding unit holds both ends of the stick, and includes a fixed arm and a pair of actuating arms, wherein the pair of actuating arras alternately holds the stick and avoids the loop of the chain of sausages. The pivoting imparting unit sequentially pivots the plurality of pivoting hooks at a predetermined pivoting imparting position.

8 Claims, 4 Drawing Sheets

(56) References Cited

U.S. PATENT DOCUMENTS

| | | | |
|---|---|---|---|
| 8,708,783 B2 | 4/2014 | Tamaki | |
| 8,795,038 B2* | 8/2014 | Fischer | A22C 15/002 |
| | | | 452/51 |
| 9,044,030 B2* | 6/2015 | Nakamura | A22C 15/001 |
| 10,834,931 B2* | 11/2020 | Baechtle | A22C 15/007 |

* cited by examiner

SAUSAGE STICKING SYSTEM

BACKGROUND OF THE INVENTION

Field of the Invention

The present invention relates to a sausage sticking system, and more particularly to a sausage sticking system for hanging on a stick a chain of sausages whose casing having a predetermined length is filled with ingredients.

Description of the Related Art

In a sausage production line, first, a casing having a predetermined length is filled with ingredients by using a sausage filling machine, and is twisted to form a chain of sausages. Then, such a chain of sausages is hung on a stick by a sausage sticking system. Thereafter, the sausages are transferred to subsequent heat treatment and smoke treatment processes, etc.

Examples of a sausage sticking system used for hanging a chain of sausages on a stick include one in which hooks attached at predetermined intervals to an endless chain which is an endless circulation body are used to form loops of a chain of sausages, and a stick passes through the loops to hang the chain of sausages.

In such a sausage sticking system, Patent Document 1 discloses a sausage sticking system capable of transferring a chain of sausages for one stick hooked on hooks to a stick simply by moving the stick held at one end in a horizontal direction. In the sausage sticking system, hook portions that rotate about a substantially horizontal axis are attached to an endless circulation body at regular intervals. The chain of sausages is hooked on the hook portions to form loops, and the hook portions are rotated, so that the chain of sausages hooked on the hook portions can be transferred to the stick which passes through the loops and is held at one end.

Further, Patent Document 2 discloses a sausage sticking system that hangs a chain of sausages on a stick held at both ends. The sausage sticking system is one in which a front part of the stick passing through the loop of the chain of sausages is supported by a front stick support member, and a rear part of the stick is supported by a rear stick support member. The rear stick support member is provided on a second endless circulation body that moves in the same traveling direction as a first endless circulation body to which the hook portions are attached.

CITATION LIST

Patent Document

Patent Document 1: JP-A-2019-097539
Patent Document 2: JP-A-2006-197935

However, in a case of the sausage sticking system that transfers the chain of sausages from the hook portions to the stick held at one end as in Patent Document 1, since the stick is held at one end, there is a risk that the stick may curve due to weight when the chain of sausages is hung. If the stick curves, there is a risk that the hung chain of sausages may fall. It is difficult to pass the curved stick through the loops of the chain of sausages, and a tip of the stick further hits the chain of sausages and may damage the sausage. Further, when the curved stick is transferred to the subsequent heat treatment and smoke treatment processes, there is also a risk that the stick may fall from a trolley or the chain of sausages may be gathered near a center of the stick unevenly. Even if the stick does not curve, the stick sways since one end is held, making the stick difficult to hang the chain of sausages in a correct position. Furthermore, there are risks that the chain of sausages also sways if the stick sways, a twisted portion of the chain of sausages may twist back, a casing may be easily cut, and an appearance may be deformed, and resulting in a defective product.

Due to a configuration in which the chain of sausages is transferred from the hooks to the stick by a cooperative operation of the hooks and a guide groove of a transfer execution unit, the sausage sticking system of Patent Document 1 can hang the chain of sausages at a specific position determined by the guide groove at a specific interval. Therefore, it is difficult to change positions and intervals at which the chain of sausages is hung on the stick according to a length of the casing.

In the sausage sticking system of Patent Document 2, since the chain of sausages can be hung on the stick held at both ends, the stick does not curve or sway, unlike the sausage sticking system in which the chain of sausages is hung on the stick held at one end. However, the positions and intervals at which the chain of sausages is hung on the stick cannot be changed according to the length of the casing.

The length of the casing is not constant, and the number of loops of the chain of sausages hung on one stick changes according to the length of the casing. In the related art where a hanging position cannot be changed, when the chain of sausages is hung at a specific position at a specific interval, if the casing is short, there is a risk that the chain of sausages may be unevenly hung on one stick. As a result, non-uniform gaps are generated in chains of sausages respectively hung on a plurality of sticks mounted on a trolley. Such non-uniform gaps may lead to non-uniform smoke treatment in the subsequent smoke treatment process, resulting in a defective product. Therefore, a worker spends a lot of time and effort to re-hang the sausages.

Therefore, it is desired to develop a sausage sticking system in which a stick does not sway or curve, and positions and intervals at which a chain of sausages is hung on the stick can be changed according to a length of a casing.

In view of such circumstances, the present invention provides a sausage sticking system capable of changing positions and intervals at which a chain of sausages is hung on a stably held stick according to a length of a casing.

SUMMARY OF THE INVENTION

In order to achieve the above object of the present invention, a sausage sticking system according to the present invention includes: a hook conveying unit including a plurality of pivoting hooks pivotable and arranged at predetermined intervals, and conveying the plurality of pivoting hooks at a predetermined speed, the hook conveying unit being configured such that the chain of sausages is hooked on each of the plurality of pivoting hooks to form a loop respectively and the loop of the chain of sausages hooked on each of the plurality of pivoting hooks is dropped onto the stick passing through the loop by pivoting each of the plurality of pivoting hooks; a stick holding unit holding both ends of the stick on which the chain of sausages hooked on the plurality of pivoting hooks of the hook conveying unit is to be hung, and including a fixed arm and a pair of actuating arms, the fixed arm holding a vicinity of one end of the stick on a side further from a conveying direction of the plurality of pivoting hooks, and the pair of actuating arms holding a vicinity of another end of the stick on a side closer to the conveying direction of the plurality of pivoting hooks, wherein the pair of actuating arms alternately performs an operation of holding the stick and an operation of avoiding the loop of the chain of sausages in order to sequentially pass the stick through each the loop of the chain of sausages hooked on the plurality of pivoting hooks; and a pivoting imparting unit configured to sequentially pivot the plurality of pivoting hooks at a predetermined pivoting imparting position while moving in a direction opposite to the conveying direction of the plurality of pivoting hooks of the hook conveying unit such that each the loop of the chain of sausages hooked on the plurality of pivoting hooks of the hook conveying unit is dropped at a predetermined position and a predetermined interval onto the stick.

Here, the hook conveying unit may include an endless circulation body configured to move on an elliptical orbit, and each of the plurality of pivoting hooks of the hook conveying unit includes: a hook base connected to the endless circulation body and including a pivot shaft; a bearing pivotably supporting the pivot shaft; a sausage hook unit formed on a lower side of the bearing and hooking the loop of the chain of sausages; and a pivoting imparting receiving unit formed on an upper side of the bearing and against which the pivoting imparting unit abuts.

The pivoting imparting unit may wait at the predetermined pivoting imparting position, and pivot each of the plurality of pivoting hooks by which the pivoting imparting receiving unit of each of the plurality of pivoting hooks conveyed at the predetermined speed by the hook conveying unit abuts against the pivoting imparting unit.

The pivoting imparting unit may include an abutting arm configured to abut against the pivoting imparting receiving unit, and the abutting arm may extend so as to abut against the pivoting imparting receiving unit when the pivoting imparting unit moves in the direction opposite to the conveying direction of the plurality of pivoting hooks of the hook conveying unit, and may contract so as not to abut against the pivoting imparting receiving unit when the pivoting imparting unit returns to the conveying direction of the plurality of pivoting hooks of the hook conveying unit after the pivoting is imparted.

Furthermore, the sausage sticking system may further include a control unit presetting the number of and an interval between the loops of the chain of sausages to be hung on one stick based on the predetermined length of the casing, wherein the control unit controls a conveying speed of the hook conveying unit, operations of the pair of actuating arms of the stick holding unit, and a pivoting imparting operation of the pivoting imparting unit based on the preset number of and interval between the loops of the chain of sausages.

The sausage sticking system of the present invention has an advantage that the positions and intervals at which the chain of sausages is hung can be changed according to the length of the casing with respect to the stably held stick.

DETAILED DESCRIPTION OF THE PREFERRED EMBODIMENTS

Figure 1:
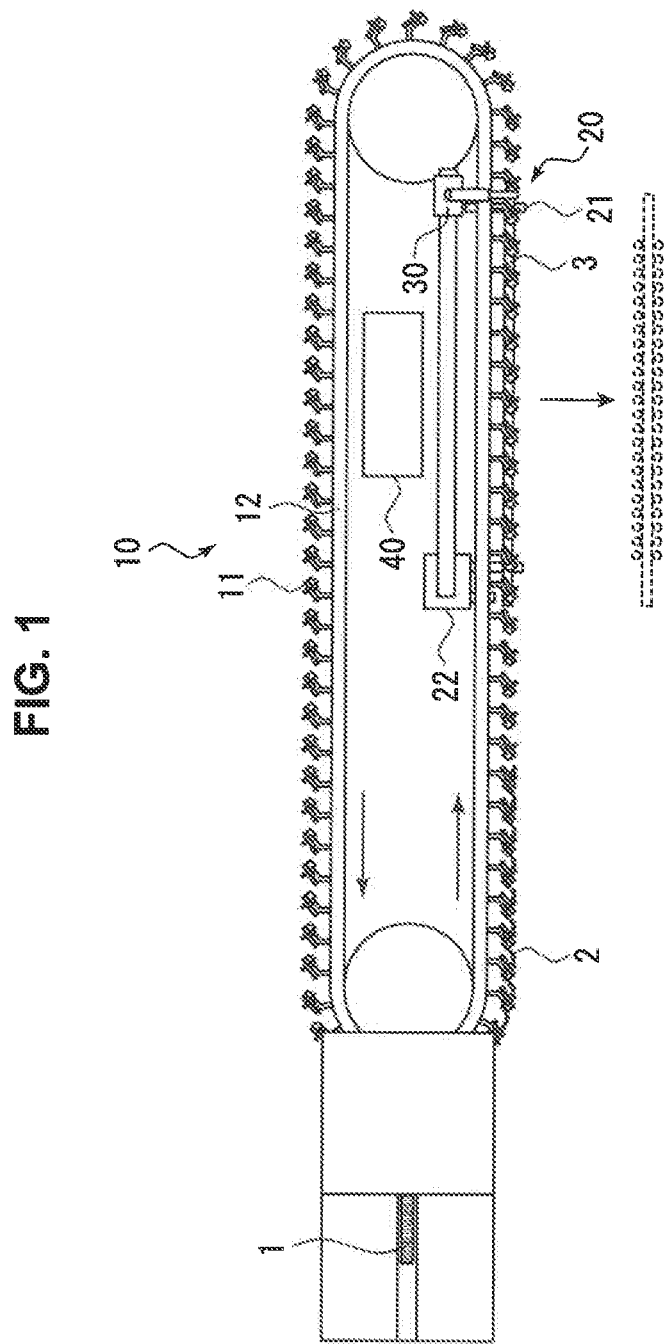
FIG. 1 is a schematic top view for illustrating an overall image of a sausage sticking system of the present invention.

Hereinafter, embodiments of the present invention will be described with reference to a shown example. FIG. 1 is a schematic top view for illustrating an overall image of a sausage sticking system of the present invention. As illustrated in FIG. 1, the sausage sticking system of the present invention mainly includes a hook conveying unit 10, a stick holding unit 20, and a pivoting imparting unit 30. The sausage sticking system of the present invention is used to hang on a stick 3 a chain of sausages 2 whose casing 1 having a predetermined length is filled with ingredients by using a sausage filling machine. Here, the chain of sausages 2 is in which the casing 1 is filled with the ingredients and twisted at regular intervals so that a plurality of sausages are connected in a chain manner. The stick 3 on which the chain of sausages 2 is hung may be taken out from the stick holding unit 20 and transferred to a subsequent smoke treatment process or the like.

The casing 1 may be a natural casing made of intestines of pigs or sheep or an artificial casing made of collagen or the like. In a case of the natural casing, a length of the casing cannot be known in advance, but in a case of the artificial casing, the length of the casing can be known in advance. Either the natural casing or the artificial casing is acceptable, and as will be described later, in the sausage sticking system of the present invention, positions and intervals at which the chain of sausages 2 is hung on the stick 3 can be changed according to the length of the casing 1, and thus, in the case of the artificial casing in which the length of the casing 1 can be known in advance, the positions and intervals can be designated in advance.

The hook conveying unit 10 conveys a plurality of pivoting hooks 11 at a predetermined speed. The plurality of pivoting hooks 11 are arranged at predetermined intervals. The hook conveying unit 10 is configured such that the loop of the chain of sausages 2 hooked on each of the pivoting hooks 11 is dropped onto the stick 3 passing through the loop by pivoting each of the pivoting hooks 11.

The hook conveying unit 10 includes an endless circulation body 12. The endless circulation body 12 is configured to move on an elliptical orbit, as illustrated in FIG. 1. The endless circulation body 12 may be made of, for example, a chain loop or a belt loop. The endless circulation body 12 may be configured to travel from a position where the chain of sausages 2 is hooked on the plurality of pivoting hooks 11, pass through a position where the chain of sausages 2 is dropped onto the stick 3, and return to a position where the chain of sausages 2 is to be hooked on the empty hooks after the chain of sausages 2 is dropped. The stick 3 is arranged parallel to the endless circulation body 12, and the pivoting hooks 11 are conveyed along the stick 3. Here, the conveying of the pivoting hooks 11 of the hook conveying unit 10 may be performed intermittently. The chain of sausages 2 may be sequentially hooked on the pivoting hooks 11 from the sausage filling machine while the conveying of the pivoting hooks 11 is temporarily stopped. The conveying of the pivoting hooks of the hook conveying unit 10 is not necessarily limited to the intermittent conveying, and may be performed continuously, and the chain of sausages 2 may be sequentially hooked on the pivoting hooks 11 in accordance with a conveying operation.

Figure 2:
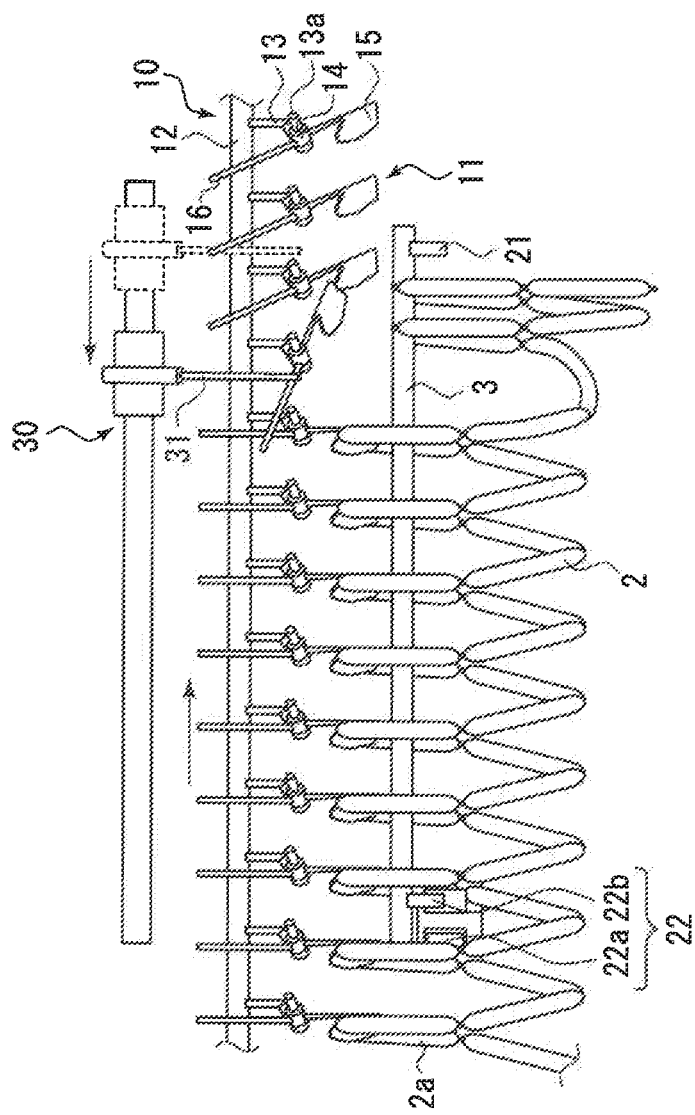
FIG. 2 is a schematic side view for illustrating details of the sausage sticking system of the present invention.

A specific configuration of the hook conveying unit 10 will be described with reference to FIG. 2. FIG. 2 is a schematic side view for illustrating details of the sausage sticking system of the present invention. In FIG. 2, parts having the same reference numerals as those in FIG. 1 represent the same objects. The plurality of pivoting hooks 11 are connected to the endless circulation body 12 at regular intervals and is conveyed along the movement of the endless circulation body 12 on the elliptical orbit. The chain of sausages 2 is hooked on each of the plurality of pivoting hooks 11 to form one loop 2a. The loop 2a is a loop formed by connecting a plurality of sausages in a chain manner, and for example, as illustrated in FIG. 2, one loop 2a includes four sausages. The number of sausages forming the loop is not particularly limited to the illustrated example.

As illustrated in FIG. 2, each of the pivoting hooks 11 includes a hook base 13, a bearing 14, a sausage hook unit 15, and a pivoting imparting receiving unit 16. The hook base 13 is connected to the endless circulation body 12. The hook base 13 includes a pivot shaft 13a. The pivoting hook 11 is configured to pivot about the pivot shaft 13a. The bearing 14 pivotably supports the pivot shaft 13a. The sausage hook unit 15 is formed on a lower side of the bearing 14. The sausage hook unit 15 is a unit that hooks the loop 2a of the chain of sausages 2. The pivoting imparting receiving unit 16 is formed on an upper side of the bearing 14. The pivoting imparting receiving unit 16 is a unit against which the pivoting imparting unit 30 which will be described later abuts. The pivoting hook 11 may be obtained by integrally forming the pivoting imparting receiving unit 16 and the sausage hook unit 15 above and below the bearing 14 of the hook base 13. A weight balance between the sausage hook unit 15 and the pivoting imparting receiving unit 16 may be adjusted such that the sausage hook unit 15 goes to the lower side when the loop 2a is not hooked. Here, the pivot shaft 13a is oriented obliquely with respect to the stick 3 when viewed from above, and the pivoting hook 11 above the stick 3 is configured to pivot about the pivot shaft 13a directed in an oblique direction. Accordingly, when the pivoting hook 11 is pivoted by the pivoting imparting unit 30 which will be described later, the pivoting hook 11 can be prevented from abutting against the adjacent pivoting hook 11.

The sausage hook unit 15 in the illustrated example has an L shape. Specifically, the sausage hook unit 15 has a shape obtained by bending a plate-like body having a certain width into the L shape such that a twisted portion of the chain of sausages 2 is hung and the loop 2a is widened laterally to make the stick 3 pass through the loop 2a. However, the present invention is not limited thereto, and any shape may be used as long as the loop 2a is hooked on the sausage hook unit 15 and the loop 2a can be dropped by pivoting.

Next, the stick holding unit 20 holds both ends of the stick 3 when the chain of sausages 2 hooked on the plurality of pivoting hooks 11 of the hook conveying unit 10 is to be hung on the stick 3. The stick holding unit 20 includes a fixed arm 21 and a pair of actuating arms 22. The fixed arm 21 holds the vicinity of the end of the stick 3 at a side farther from a conveying direction of the plurality of pivoting hooks 11. Here, the side farther from the conveying direction of the pivoting hooks 11 is a right side in FIG. 2. That is, the fixed arm 21 holds the vicinity of the end of the stick 3 on the side where the pivoting hooks 11 arrive later. The fixed arm 21 may be appropriately provided with a U-shaped groove or the like in order to hold the stick 3 from below. The pair of actuating arms 22 hold the vicinity of the end of the stick 3 on a side closer to the conveying direction of the plurality of pivoting hooks 11. Here, the side closer to the conveying direction of the pivoting hooks 11 is a left side in FIG. 2. That is, the pair of actuating arms 22 hold the vicinity of the end of the stick 3 on a side where the pivoting hooks 11 arrive faster. The pair of actuating arms 22 alternately perform an operation of holding the stick 3 and an operation of avoiding the loop 2a of the chain of sausages 2 in order to sequentially pass the stick 3 through each the loop 2a of the chain of sausages 2 hooked on the plurality of pivoting hooks 11. The pair of actuating arms 22 may also be appropriately provided with a U-shaped groove or the like in order to hold the stick 3 from below.

Figure 3A:
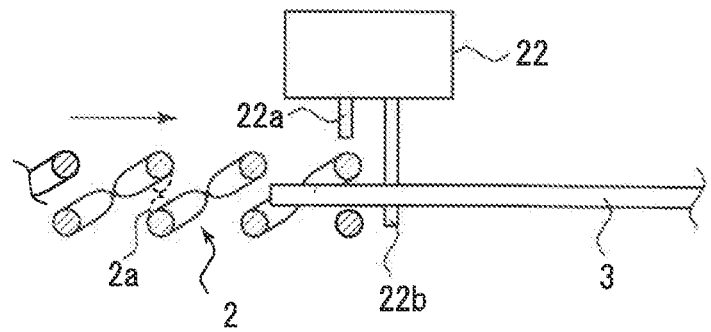
FIG. 3A, FIG. 3B, FIG. 3C, and FIG. 3D are schematic top views for illustrating details of operations of a pair of actuating arms of a stick holding unit of the sausage sticking system of the present invention.
Figure 3B:
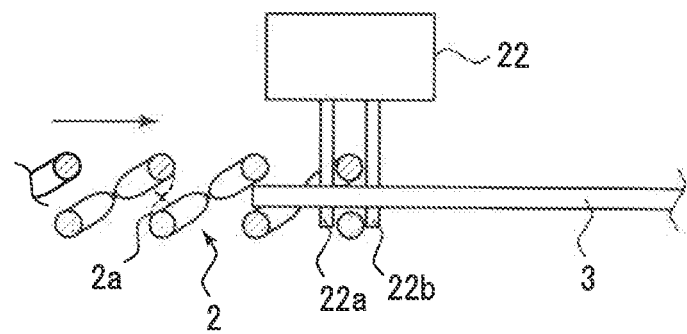
Figure 3C:
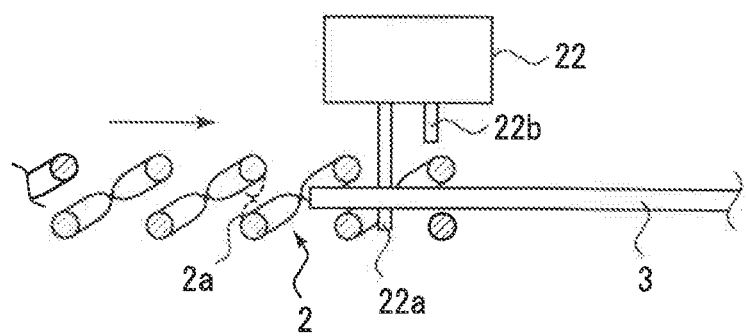
Figure 3D:
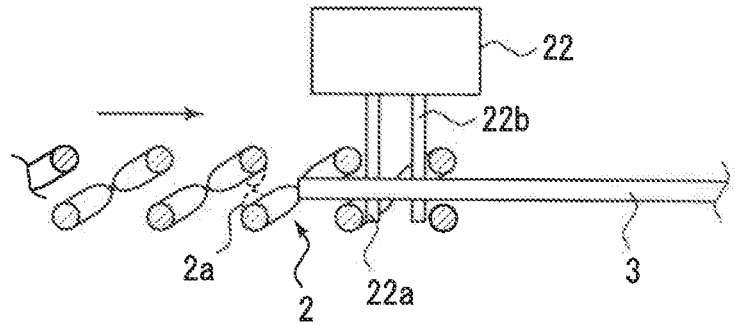

Details of the operations of the pair of actuating arms 22 will be illustrated with reference to FIG. 3A, FIG. 3B, FIG. 3C, and FIG. 3D. FIG. 3A, FIG. 3B, FIG. 3C, and FIG. 3D are schematic top views for illustrating the details of the operations of the pair of actuating arms of the stick holding unit of the sausage sticking system of the present invention. In FIG. 3A, FIG. 3B, FIG. 3C, and FIG. 3D, parts having the same reference numerals as those in FIG. 1 represent the same objects. The chain of sausages 2 is partially illustrated in a cross section. The pair of actuating arms 22 include an arm 22a and an arm 22b. The arms 22a and 22b of the pair of actuating arms 22 protrude below the stick 3 to support the stick 3 from below when holding the stick 3, and move downward and retract when avoiding the loop 2a of the chain of sausages 2. As illustrated in FIG. 3A, the loop 2a of the chain of sausages 2 is conveyed by the hook conveying unit 10 from left to right in FIG. 3A. In this case, first, the arm 22b of the pair of actuating arms 22 performs the operation of holding the stick 3. That is, the arm 22b protrudes below the stick 3 and holds the stick 3 in a manner of supporting the stick from below. On the other hand, the arm 22a performs the operation of avoiding the loop 2a of the chain of sausages 2. That is, the arm 22a is retracted from a lower side of the stick 3 so as not to hit the loop 2a of the chain of sausages 2 conveyed from the left. When the loop 2a of the chain of sausages 2 conveyed from left to right in a manner of not hitting the arm 22a is conveyed to the front of the arm 22b, the arm 22a and the arm 22b are exchanged, and in this case, as illustrated in FIG. 3B, both the arms 22a and 22b are temporarily operated to hold the stick 3. Then, as illustrated in FIG. 3C, the arm 22b performs the operation of avoiding the loop 2a of the chain of sausages 2. In this case, the arm 22a remains in a state of holding the stick 3. When the next loop 2a is conveyed to the front of the arm 22a while the loop 2a of the chain of sausages 2 conveyed from left to right in the manner of not hitting the arm 22b is conveyed, the arm 22a and the arm 22b are exchanged, and also in this case, as illustrated in FIG. 3D, both the arms 22a and 22b are temporarily operated to hold the stick 3. Then, the arm 22a performs the operation of avoiding the loop 2a of the chain of sausages 2, and is in the state as illustrated in FIG. 3A again. By repeating such operations, one of the pair of actuating arms 22 is in the state of holding the stick 3.

Accordingly, the arms 22a and 22b of the pair of the actuating arms 22 are configured to repeat the operations of extending and contracting at predetermined timings in conjunction with the conveying operation of the pivoting hooks 11 of the hook conveying unit 10. Therefore, the stick holding unit 20 can pass the stick 3 through the loop 2a of the chain of sausages 2 while always stably holding both ends of the stick 3 by the actuating arms 22 together with the fixed arm 21. A distance between the arms 22a and 22b of the pair of actuating arms 22 may be wider than a diameter of the chain of sausages 2, and may be narrower than a distance between the loops 2a of the chain of sausages 2, that is, an interval between the plurality of pivoting hooks 11.

Next, the pivoting imparting unit 30 will be described. Referring to FIG. 2 again, the pivoting imparting unit 30 is configured to sequentially pivot the plurality of pivoting hooks 11 at a predetermined pivoting imparting position while moving in a direction opposite to the conveying direction of the plurality of pivoting hooks 11 of the hook conveying unit 10, so that the loops 2a of the chain of sausages 2 hooked on the pivoting hooks 11 of the hook conveying unit 10 are dropped at predetermined positions and the predetermined intervals onto the stick 3. As illustrated in FIG. 2, the pivoting hook 11 with the chain of sausages 2 hooked thereon is conveyed from left to right in FIG. 2. In this case, the pivoting imparting unit 30 may, for example, wait at the predetermined pivoting imparting position, and each of the pivoting imparting receiving units 16 of the plurality of pivoting hooks 11 conveyed at the predetermined speed by the hook conveying unit 10 may abut against the pivoting imparting unit 30, so that the pivoting imparting unit 30 may pivot the pivoting hooks 11. The pivoting imparting unit 30 may not wait at the predetermined pivoting imparting position, and be moved in the direction opposite to the conveying direction of the pivoting hooks 11 so as to sequentially abut against each the pivoting imparting receiving unit 16 at the predetermined pivoting imparting position. Accordingly, by pivoting the pivoting hook 11 by the pivoting imparting unit 30, the loop 2a of the chain of sausages 2 hooked on the pivoting hook 11 can be dropped onto the stick 3 passing through the loop 2a.

In this case, the pivoting imparting position of the pivoting imparting unit 30 can be freely set such that the loop 2a of the chain of sausages 2 is dropped onto the stick 3 at the predetermined position and the predetermined interval. That is, the positions and intervals at which the chain of sausages 2 is hung can be changed according to the pivoting imparting position of the pivoting imparting unit 30, and the loop 2a of the chain of sausages 2 can be hung at a desired position simply by causing the pivoting imparting unit 30 to abut against the pivoting imparting receiving unit 16 at the desired position.

The interval between the plurality of pivoting hooks 11 is a maximum interval of the predetermined intervals at the pivoting imparting position of the pivoting imparting unit 30. That is, an interval for hanging a widest loop of the chain of sausages 2 is determined by the interval between the plurality of pivoting hooks 11. For example, when the hook conveying unit 10 conveys the pivoting hooks 11 intermittently, the interval for hanging the widest loop is obtained when all the loops 2a for one stick are dropped from the pivoting hooks 11 while the conveying of the pivoting hook 11 is stopped. Therefore, for example, the interval between the plurality of pivoting hook 11 may be adjusted to be the interval for hanging the widest loop of the chain of sausages 2 to be hung, that is, an interval in a case where the length of the casing 1 is short and the number of loops is minimum. For example, when the length of the casing 1 is long and the number of loops of the chain of sausages 2 for one stick is large, the pivoting hook 11 may be pivoted by the pivoting imparting unit 30 at the pivoting imparting position with a narrower interval than the interval between the plurality of pivoting hooks 11, so that the loop 2a is dropped. Accordingly, by adjusting a relation between the conveying speed of the pivoting hook 11 of the hook conveying unit 10 and the pivoting imparting operation performed by the pivoting imparting unit 30, the loops 2a of the chain of sausages 2 on one stick can be hung at equal intervals regardless of the interval between the plurality of pivoting hooks 11.

As illustrated in FIG. 2, the pivoting imparting unit 30 may include an abutting arm 31, for example. The abutting arm 31 abuts against the pivoting imparting receiving unit 16 of the pivoting hook 11. The abutting arm 31 may be extendable and retractable. For example, the abutting arm may include a cylinder or the like. The abutting arm 31 may be in an extended state so as to abut against the pivoting imparting receiving unit 16 when the pivoting imparting unit 30 moves in the direction opposite to the conveying direction of the plurality of pivoting hooks 11 of the hook conveying unit 10, that is, from right to left in FIG. 2. Then, the abutting arm 31 abuts against the pivoting imparting receiving unit 16, and the pivoting hooks 11 are sequentially pivoted at predetermined positions, so that the loops 2a of the chain of sausages 2 hooked on the pivoting hooks 11 may be dropped at the predetermined positions and the predetermined intervals onto the stick 3. The pivoting imparting unit 30 is not particularly limited to the illustrated example, and may have any shape as long as the pivoting imparting unit 30 can abut against the pivoting imparting receiving unit 16. In the illustrated example, the abutting arm 31 is in the extended state and abuts against the pivoting imparting receiving unit 16, but the present invention is not limited thereto, and may be configured such that a moment the pivoting hook 11 comes to the pivoting imparting position, the pivoting imparting receiving unit 16 is hit to cause the pivoting.

Figure 4:
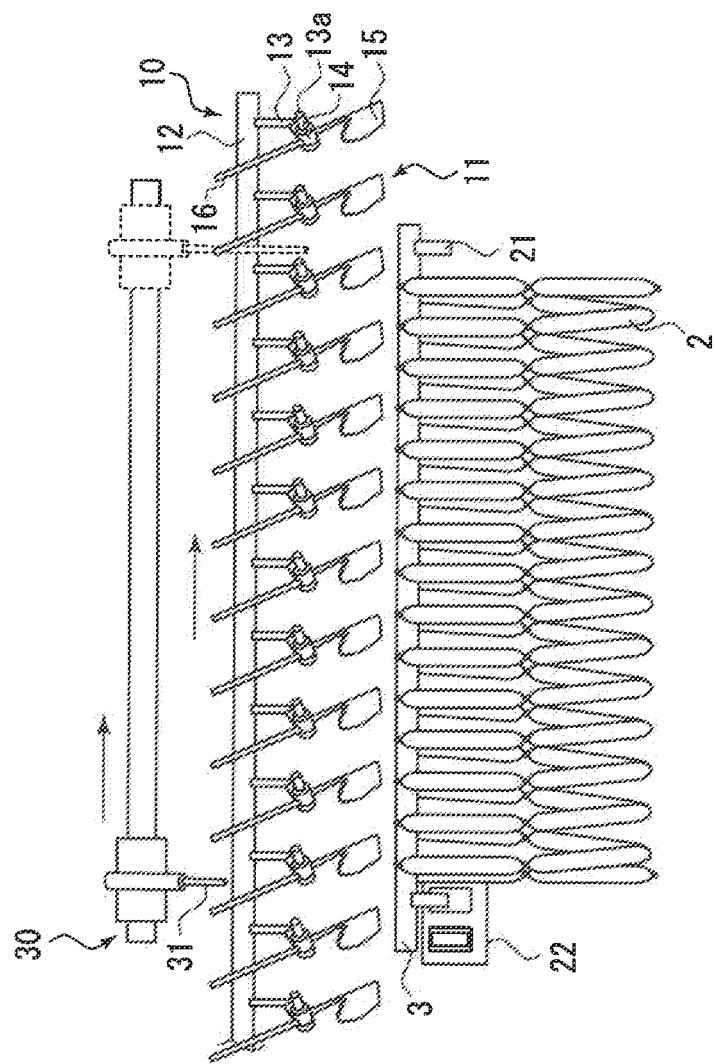
FIG. 4 is a schematic side view for illustrating details of an operation of a pivoting imparting unit of the sausage sticking system of the present invention.

After all the loops 2a of the chain of sausages 2 to be hung on one stick 3 are dropped onto the stick 3, as illustrated in FIG. 4, the abutting arm 31 of the pivoting imparting unit 30 may be in a contracted state. FIG. 4 is a schematic side view for illustrating details of an operation of the pivoting imparting unit of the sausage sticking system of the present invention. In FIG. 4, parts having the same reference numerals as those in FIG. 2 represent the same objects. As illustrated in FIG. 4, after pivoting the pivoting hooks 11 for one stick, the abutting arm 31 may be contracted so as not to abut against the pivoting imparting receiving unit 16 when the pivoting imparting unit 30 returns to the conveying direction of the plurality of pivoting hooks 11 of the hook conveying unit 10, that is, from left to right in FIG. 4. Accordingly, when the pivoting is imparted, that is, when the pivoting imparting unit 30 moves from right to left in FIG. 4, the abutting arm 31 can be configured to extend to abut against the pivoting imparting receiving unit 16 to pivot the pivoting hooks 11, and after the pivoting is imparted, that is, when the pivoting imparting unit 30 returns from left to right in FIG. 4, the abutting arm 31 can be configured to contract and not abut against the pivoting imparting receiving unit 16. The pivoting imparting unit 30 returns to an original position and waits to hang the chain of sausages 2 on a next stick 3.

The illustrated example shows that the abutting arm 31 can be extended and contracted by the cylinder, but the present invention is not limited thereto, and any configuration may be used as long as the abutting arm is lowered to a position where the pivoting imparting receiving unit 16 can be abutted when the pivoting is imparted, and can rise to a position where the pivoting imparting receiving unit 16 is not abutted after the pivoting is imparted.

As described above, the sausage sticking system of the present invention can freely set the number of and interval between the loops 2a of the chain of sausages 2 to be hung on one stick 3. Therefore, for example, when the length of the casing 1 to be used is known in advance, it is possible to use the control unit 40 that presets the number of and interval between the loops 2a of the chain of sausages 2 to be hung on one stick 3 based on the predetermined length of the casing 1. For example, when an effective length of the stick 3 and the number of loops 2a are input to the control unit 40, the interval between the loops 2a of the chain of sausages 2 to be hung on one stick 3 is calculated and set in the sausage sticking system. The control unit 40 may control the conveying speed of the hook conveying unit 10, the operations of the pair of actuating arms 22 of the stick holding unit 20, and the pivoting imparting operation of the pivoting imparting unit 30 based on the set number of and interval between loops 2a of the chain of sausages 2.

The sausage sticking system of the present invention is not limited to the above illustrated examples, and of course, various changes can be made without departing from the gist of the present invention. For example, in the illustrated examples above, the endless circulation body moves counterclockwise, but may move clockwise, and accordingly, the pivoting hook, the pivoting imparting unit, and the like may also be reversed from the illustrated example.

What is claimed is:

1. A sausage sticking system for hanging, on a stick, a chain of sausages whose casing having a predetermined length is filled with ingredients, the sausage sticking system comprising:
    a hook conveying unit including a plurality of pivoting hooks pivotable and arranged at predetermined intervals, and conveying the plurality of pivoting hooks at a predetermined speed, the hook conveying unit being configured such that the chain of sausages is hooked on each of the plurality of pivoting hooks to form a loop respectively and that the loop of the chain of sausages hooked on each of the plurality of pivoting hooks is dropped onto the stick passing through the loop by pivoting each of the plurality of pivoting hooks;
    a stick holding unit holding both ends of the stick on which the chain of sausages hooked on the plurality of pivoting hooks of the hook conveying unit is to be hung, and including a fixed arm and a pair of actuating arms, the fixed arm holding a vicinity of one end of the stick on a side further from a conveying direction of the plurality of pivoting hooks, and the pair of actuating arms holding a vicinity of another end of the stick on a side closer to the conveying direction of the plurality of pivoting hooks, wherein the pair of actuating arms alternately performs a holding operation in which a first actuating arm of the pair of actuating arms holds the stick when a second actuating arm of the pair of actuating arms avoids the loop of the chain of sausages and an avoiding operation in which the first actuating arm of the pair of actuating arms avoids the loop of the chain of sausages when the second actuating arm of the pair of actuating arms holds the stick in order to sequentially pass the stick through each the loop of the chain of sausages hooked on the plurality of pivoting hooks; and
    a pivoting imparting unit configured to sequentially pivot the plurality of pivoting hooks at a predetermined pivoting imparting position while moving in a direction opposite to the conveying direction of the plurality of pivoting hooks of the hook conveying unit such that each the loop of the chain of sausages hooked on the plurality of pivoting hooks of the hook conveying unit is dropped at a predetermined position and a predetermined interval onto the stick.

2. The sausage sticking system according to claim 1, wherein
    the hook conveying unit includes an endless circulation body configured to move on an elliptical orbit, and
    each of the plurality of pivoting hooks of the hook conveying unit includes:
        a hook base connected to the endless circulation body and including a pivot shaft;
        a bearing pivotably supporting the pivot shaft;
        a sausage hook unit formed on a lower side of the bearing and hooking the loop of the chain of sausages; and
        a pivoting imparting receiving unit formed on an upper side of the bearing and against which the pivoting imparting unit abuts.

3. The sausage sticking system according to claim 2, wherein
    the pivoting imparting unit waits at the predetermined pivoting imparting position, and pivots each of the plurality of pivoting hooks by which the pivoting imparting receiving unit of each of the plurality of pivoting hooks conveyed at the predetermined speed by the hook conveying unit abuts against the pivoting imparting unit.

4. The sausage sticking system according to claim 3, wherein
    the pivoting imparting unit includes an abutting arm configured to abut against the pivoting imparting receiving unit, and
    the abutting arm extends so as to abut against the pivoting imparting receiving unit when the pivoting imparting unit moves in the direction opposite to the conveying direction of the plurality of pivoting hooks of the hook conveying unit, and contracts so as not to abut against the pivoting imparting receiving unit when the pivoting imparting unit returns to the conveying direction of the plurality of pivoting hooks of the hook conveying unit after the pivoting is imparted.

5. The sausage sticking system according to claim 1, further comprising:
    a control unit presetting the number of and an interval between the loops of the chain of sausages to be hung on one stick based on the predetermined length of the casing, wherein
    the control unit controls a conveying speed of the hook conveying unit, operations of the pair of actuating arms of the stick holding unit, and a pivoting imparting operation of the pivoting imparting unit based on the preset number of and interval between the loops of the chain of sausages.

6. The sausage sticking system according to claim 2, further comprising:
    a control unit presetting the number of and an interval between the loops of the chain of sausages to be hung on one stick based on the predetermined length of the casing, wherein
    the control unit controls a conveying speed of the hook conveying unit, operations of the pair of actuating arms of the stick holding unit, and a pivoting imparting operation of the pivoting imparting unit based on the preset number of and interval between the loops of the chain of sausages.

7. The sausage sticking system according to claim 3, further comprising:

a control unit presetting the number of and an interval between the loops of the chain of sausages to be hung on one stick based on the predetermined length of the casing, wherein the control unit controls a conveying speed of the hook conveying unit, operations of the pair of actuating arms of the stick holding unit, and a pivoting imparting operation of the pivoting imparting unit based on the preset number of and interval between the loops of the chain of sausages.

8. The sausage sticking system according to claim 4, further comprising:

a control unit presetting the number of and an interval between the loops of the chain of sausages to be hung on one stick based on the predetermined length of the casing, wherein the control unit controls a conveying speed of the hook conveying unit, operations of the pair of actuating arms of the stick holding unit, and a pivoting imparting operation of the pivoting imparting unit based on the preset number of and interval between the loops of the chain of sausages.

* * * * *